US006726989B2

(12) United States Patent
Dugan

(10) Patent No.: US 6,726,989 B2
(45) Date of Patent: Apr. 27, 2004

(54) FIBERS INCLUDING A NANOCOMPOSITE MATERIAL

(75) Inventor: Jeffrey S. Dugan, Erwin, TN (US)

(73) Assignee: Fiber Innovation Technology, Inc., Johnson City, TN (US)

(*) Notice: Subject to any disclaimer, the term of this patent is extended or adjusted under 35 U.S.C. 154(b) by 0 days.

(21) Appl. No.: 10/068,749

(22) Filed: Feb. 5, 2002

(65) Prior Publication Data

US 2002/0110686 A1 Aug. 15, 2002

Related U.S. Application Data

(60) Provisional application No. 60/267,528, filed on Feb. 9, 2001.

(51) Int. Cl.⁷ .................................................. D01F 8/00
(52) U.S. Cl. ....................... 428/372; 428/370; 428/373; 428/374
(58) Field of Search ................................ 428/372, 374, 428/370, 373

(56) References Cited

U.S. PATENT DOCUMENTS

| 4,810,734 A | | 3/1989 | Kawasumi et al. |
|---|---|---|---|
| 5,102,948 A | | 4/1992 | Deguchi et al. |
| 5,385,776 A | * | 1/1995 | Maxfield ............... 428/297 |
| 5,552,469 A | | 9/1996 | Beall et al. |
| 6,117,541 A | | 9/2000 | Frisk |

FOREIGN PATENT DOCUMENTS

| JP | 7-207134 A | 8/1995 |
|---|---|---|
| JP | 7-228762 A | 8/1995 |
| JP | 7-331092 A | 12/1995 |
| JP | 8-151449 A | 6/1996 |
| JP | 8-259806 A | 10/1996 |
| JP | 8-259846 A | 10/1996 |
| WO | WO 93/04117 | 3/1993 |

OTHER PUBLICATIONS

Giannelis, "Flame Retardant Nanocomposite Materials," *Annual Conference of Fire Research—NISTIR 6242*, Oct., 1998, pp. 39–40.

Giannelis, "Polymer Layered Silicate Nanocomposites," *Adv. Mater.*, 1996, 8, No. 1, p. 29.

* cited by examiner

*Primary Examiner*—N. Edwards
(74) *Attorney, Agent, or Firm*—Alston & Bird LLP

(57) ABSTRACT

Fibers are disclosed which include a polymeric nanocomposite material. The nanocomposite material includes a polymeric resin matrix and a plurality of nanosized platelet particles dispersed therein.

20 Claims, No Drawings

FIBERS INCLUDING A NANOCOMPOSITE MATERIAL

CROSS REFERENCE TO RELATED APPLICATION

This application is related to commonly owned copending Provisional Application Serial No. 60/267,528, filed Feb. 9, 2001, incorporated herein by reference in its entirety, and claims the benefit of its earlier filing date under 35 U.S.C. 119(e).

FIELD OF THE INVENTION

The present invention is related to polymeric fibers, and more particularly to polymeric fibers formed of a nanocomposite material.

BACKGROUND OF THE INVENTION

Synthetic polymers have been widely used in the production of fibers, films, molded articles, and the like. Common thermoplastic polymers used in the production of these and other products include polyolefins, polyesters, and polyamides, among others.

Typically one or more additives can be added to the polymer melt prior to extrusion to improve specific properties. For example, an anti-oxidant is typically added to polypropylene prior to extrusion to minimize degradation. As another example, fire retardant fillers can be added to control polymer flammability. Other fillers used in the production of polymeric articles include titanium oxide ($TiO_2$), kaolin, pigments, carbon black, and the like.

While the addition of these and other fillers can improve a particular property of the resultant product, there can be problems associated with the use of such fillers. For example, the presence of a filler may improve one property of the end product while concurrently diminishing or adversely impacting another property. As an example, certain fillers can improve the flame retardant property of a polymeric article. However, high levels of loading are typically required to impart the desired degree of flame resistance. This in turn can alter the mechanical properties of the product, such as mechanical robustness.

Still further, use of fillers in the production of polymeric articles can cause processing problems. For example, fillers present in an extruded polymer can pose filter and capillary plugging hazards. In addition, the surface properties of the end product can be compromised, creating a rough, abrasive surface, instead of a smooth surface.

SUMMARY OF THE INVENTION

The present invention provides fibers formed of a polymeric nanocomposite material. Nanocomposite materials generally include a polymer having nanosized inorganic platelet particles dispersed therein, e.g., platelet particles having a nanometer size range in at least one dimension thereof.

The size of the particles can vary depending upon the material used to make the same. Generally the platelet particles can be described as modified clay materials with very high aspect ratios (the ratio of the object's width to its thickness). Thus the particles may also be described as having a very minimal thickness relative to their length. Generally such particles have an average diameter between about 10,000 Å and about 50 Å, and an aspect ratio length/thickness ranging from about 1000 to about 1. The particles typically have an average thickness of less than or about 20 Å, and preferably an average thickness of less than or about 10 Å. This is in contrast to conventional filler materials, such as kaolin, titanium dioxide, carbon and the like, which have much larger sizes and typically are roughly or substantially spherical in shape.

The resultant fibers can be monocomponent fibers. Alternatively the fibers of the invention can be multicomponent fibers, which include at least two structured polymeric components. For multicomponent fibers of the invention, generally at least one polymer segment includes a nanocomposite material, while at least one other polymeric segment includes a different nanocomposite material and/or other fiber forming polymeric material, which may or may not include nanoparticles.

The inventors have found that the fibers of the invention can exhibit several advantageous properties, as compared to conventional fibers formed without a nanocomposite material and/or formed with conventional fillers. Further, these benefits can be achieved at relatively low loading levels of the nanosized platelet particles. For example, the resultant fibers can exhibit enhanced strength, e.g., tensile yield strength and flexural modulus, as compared with fibers which are free of the nanocomposite material, or which contain conventional powdered fillers such as unexfoliated clay, silica or carbon black. Indeed, in contrast to the present invention, the use of such conventional fillers in fiber production typically degrade fiber properties such as tensile strength, tensile modulus and the like. The fibers of the invention can also exhibit improved stiffness and heat resistance, and decreased moisture absorption, flammability, and permeability, as compared to fibers prepared without filler and/or with conventional fillers.

Still further, the present invention can provide processing advantages. The nanosized nature of the platelet particles can reduce processing problems associated with the extrusion and spinning of conventional filled polymers into fibers, such as filter and capillary plugging.

DETAILED DESCRIPTION OF THE INVENTION

The present invention will be described more fully hereinafter in connection with illustrative embodiments of the invention which are given so that the present disclosure will be thorough and complete and will fully convey the scope of the invention to those skilled in the art. However, it is to be understood that this invention may be embodied in many different forms and should not be construed as being limited to the specific embodiments described and illustrated herein. Although specific terms are used in the following description, these terms are merely for purposes of illustration and are not intended to define or limit the scope of the invention. The fibers of the invention include at least one polymeric segment or component which includes a nanocomposite material. Nanocomposite materials are known in the art and are commercially available, for example, under the trade designation RTP 299A, available from RTP Company.

Such materials may generally be defined as a polymer matrix having nanosized inorganic particles dispersed therein, e.g., platelet particles having a nanometer size range in at least one dimension thereof. The size of the particles can vary depending upon the material used to make the same. Generally the platelet particles can be described as modified clay materials with very high aspect ratios (the ratio of the object's width to its thickness). Thus the particles may also be described as having a very minimal thickness relative to their length.

Although not intending to be limited to such dimensions, generally such particles have an average diameter between about 10,000 Å and about 50 Å, such that the aspect ratio length/thickness ranges from about 1000 to about 1. For the purposes of the present invention, the average diameter is defined as the diameter of a circle having an area equal to the surface area of one broad surface face of the platelet shaped particle. The average thickness of the particles can be less than or about 20 Å, and more preferably less than or about 10 Å.

The platelet particles include an exfoliated layered inorganic material. Useful exfoliated inorganic materials include those derived from swellable layered materials including natural or synthetic phyllosilicate clays. Illustrative of such materials are smectic clay minerals such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of about 8-12 Å tightly bound together at interlayer spacings of 4 Å or less, and contain exhangeable cations such as $Na^+$, $Ca^{+2}$, $K^+$ or $Mg^{+2}$ present at the interlayer surfaces.

The platelet particles may be present in the polymer matrix in varying amounts, depending upon the desired end use and properties of the resultant fibers. The amount of platelet particles present in the nanocomposites in accordance with this invention can be sufficient, for example, to improve various desired properties of the resultant fibers, such as mechanical properties of flexural modulus and tensile strength. The nanocomposite material can also impart other advantageous properties to the fibers, such as improved cut resistance and flame retardance. The nanocomposite polymer matrix can include the platelet particles in amounts ranging from about 0.01 to about 20 percent by weight, based on the total weight of the nanocomposite material present in the fiber. One advantage of nanocomposite materials over traditional filled polymers is that nanocomposites can achieve significant improvements in properties at loadings that are much lower than those typically required using conventional additives. Thus in one embodiment of the invention the particle loading of the nanocomposite material is at the lower end of this range, for example from about 0.1 to about 5 percent by weight.

As used herein, "platelet particles" are particles having two relatively flat opposite faces, the thickness of which platelets is the distance between the faces, which is relatively small compared to the size of the faces. The platelet particles dispersed in matrix polymers have the thickness of the individual layers or small multiples less than about 10, preferably less than about 5 and more preferably less than about 3 of the layers, and still more preferably 1 or 2 layers. Preferably, intercalation of every interlayer space is complete so that all or substantially all individual layers delaminate one from the other to form separate platelet particles.

There are many methods to produce specific polymeric materials containing nanocomposites, which have been previously disclosed and are known by those skilled in the pertinent art. These methods to produce nanocomposites can be grouped into three general categories: (1) in situ polymerization; (2) solution intercalation; and (3) melt exfoliation. In the first two methods, such materials can be prepared by processes in which swelling agents, such as long-chain organic cations, and water-soluble oligomers or polymers, are intercalated or absorbed between adjacent layers of a layered silicate, such as smectite clay, to thereby increase the interlayer spacing between the adjacent silicate layers, so that polymer chains can be included between the silicate layers when mixing the layered silicate with a polymer melt. See for example, U.S. Pat. No. 5,552,469, WO 93/04117, Japanese Laid Open Patent Application Nos. 8-151,449, 7207,134, 7-228,762, 7-331,092, 8-259,806, and 8-259,846.

An example of in situ polymerization of a nanocomposite is disclosed in Kawasumi et al, U.S. Pat. No. 4,810,734. Generally this process includes the steps of dispersing a predetermined amount of a clay mineral into a dispersion medium and then adding a swelling agent to this mixture. The mixture is also mixed with a monomer of a polymer. An example of solution intercalation of a nanocomposite is disclosed in Deguchi et al., U.S. Pat. No. 5,102,948. This process is similar to in situ polymerization, except the mixture is mixed with a polymer resin instead of a monomer of a polymer.

Melt exfoliation or melt intercalation is described, for example, in Polymer Layered Silicate Nanocomposites, Giannelis, Adv. Mater. 1996, 8, No. 1, 29. Unlike in situ polymerization or solution intercalation, melt exfoliation only involves the clay mineral and the polymer without the need for a swelling agent or a dispersion medium. However, a swelling agent may be used to enhance the exfoliation of the clay mineral by particular polymers. In melt exfoliation, the clay mineral and the polymer are mixed together, then heated to a temperature above the softening point of the polymer.

In the nanocomposite material, two types of structures are possible. In one the structure is intercalated, in which a single extended polymer chain is inserted between layers resulting in a well ordered multilayer with alternating polymer/inorganic layers. In another, referred to as disordered or delaminated, the inorganic layers are substantially uniformly dispersed in the polymer with random orientation throughout the polymer matrix.

The polymer resin forming the nanocomposite matrix can be any of the types of polymer resins known in the art capable of being formed into a fiber construction. Examples of suitable polymers useful in the practice of the present invention include without limitation polyolefins, including polypropylene, polyethylene, polybutene, and polymethyl pentene (PMP), polyamides, including nylon 6, polyesters, including polyethylene terephthalate, polyethylene naphthalate, polytrimethylene terephthalate, poly(1,4-cyclohexylene dimethylene terephthalate) (PCT), and aliphatic polyesters such as polylactic acid (PLA), polyphenylene sulfide, thermoplastic elastomers, polyacrylonitrile, acetals, fluoropolymers, co- and ter-polymers thereof and mixtures thereof. As noted above, the fibers of the invention can also include other conventional polymers, such as those listed above, but without the exfoliated platelet particles.

The fibers can optionally include other components not adversely affecting the desired properties thereof. Examples include, without limitation, antioxidants, stabilizers, particulates, pigments, and the like. These and other additives can be used in conventional amounts.

The fibers of the invention can be monocomponent fibers. In this regard, the fibers can be formed of 100% nanocomposite material. Alternatively, the fibers can be formed of a conventional polymer blended or randomly mixed with the nanocomposite material to form multiconstituent fibers. In this regard, multiconstituent fibers can be formed with intimate mixing, but can also be formed without intimate mixing.

Alternatively, the fibers of the invention can be multicomponent fibers, which include at least two structured polymeric components. In general, multicomponent fibers are formed of two or more polymeric materials which have been extruded together to provide continuous contiguous polymer segments which extend down the length of the fiber. For the multicomponent fibers of the invention, generally at least one polymer segment includes a nanocomposite material, while at least one other polymeric segment or component includes a different nanocomposite material and/or other fiber forming polymeric material, which may or may not contain nanoparticles.

In this embodiment of the invention, the other fiber forming material can be the same or different from the polymer of the nanocomposite material. For example, the multicomponent fibers of the present invention can include at least one component formed of a nanocomposite material of a first polymer, and at least one other component formed of a different polymer and without filler. This can provide the advantage of imparting the respective properties of each of the polymers to the composite fiber. Alternatively, the fibers can include at least one component formed of a nanocomposite material of a first polymer, and at least one other component formed of the same polymer but without filler. As an example, the fibers could include at least one unfilled nylon component and at least one nanocomposite nylon component, such as a fiber having a nanocomposite nylon core and an unfilled nylon sheath. Nanocomposites can have higher heat deflection temperatures than similar unfilled polymers, so this combination can provide a bicomponent binder fiber that can be entirely recycled as a single polymer.

The term "fiber" as used herein means both fibers of finite length, such as conventional staple fiber, as well as substantially continuous structures, such as continuous filaments, unless otherwise indicated. The fibers of the invention can be hollow or non-hollow fibers, and further can have a substantially round or circular cross section or non-circular cross sections (for example, oval, rectangular, multi-lobed, and the like).

The multicomponent fibers can have a variety of fiber configurations as known in the art. The fiber components can be arranged so as to form distinct unocclusive cross-sectional segments along the length of the fiber. For example, multicomponent fibers of the invention include those having cross-sectional configurations such as a pie/wedge, side-by-side, segmented round, segmented oval, segmented rectangular, segmented multilobal, and the like. However, other configurations are also included within the scope of the present invention, including those in which at least a portion of a one fiber segment is partially or fully occluded by an adjacent segment. Examples of other fiber shapes include, without limitation, islands in the sea, sheath/core, and the like. The multicomponent fibers of the invention can be splittable, i.e., capable of separating into microfilaments upon appropriate chemical and/or mechanical action. Alternatively the multicomponent fibers of the invention can be substantially nondissociable.

The nanocomposite material (and other polymeric resin, if present, for example in a multicomponent fiber) can be either melt-spun into fibers, which may be formed into a web for instance by carding, airlaying, or wetlaying, or melt-spun directly into fibrous webs by a spunbonding or meltblowing process. The web can then be bonded to form a nonwoven fabric. Webs of the fibers of the invention can be made according to any of the known commercial processes for making nonwoven fabrics, including processes that use mechanical, electrical, pneumatic, or hydrodynamic means for assembling fibers into a web, for example carding, wetlaying, carding/hydroentangling, wetlaying/hydroentangling, and spunbonding.

The webs can be bonded using techniques as known in the art, such as but not limited to mechanical bonding, such as hydroentanglement and needle punching, adhesive bonding, thermal bonding, and the like, to form a coherent fabric structure. An example of thermal bonding is through air bonding, although other thermal bonding techniques, such as calendering, microwave or other RF treatments, can be used.

The fibers of the invention can also be used to make other textile structures such as but not limited to woven and knit fabrics. Yarns prepared for use in forming such woven and knit fabrics are similarly included within the scope of the present invention. Such yarns may be prepared from the continuous filament or spun yarns comprising staple fibers of the present invention by methods known in the art, such as twisting or air entanglement.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation That which is claimed:

1. A multicomponent fiber comprising two or more polymeric segments, at least one of said segments comprising a polymeric nanocomposite material.

2. The multicomponent fiber of claim 1, wherein said polymeric nanocomposite material comprises a polymer having nanosized inon ganic platelet particles dispersed therein.

3. The multicomponent fiber of claim 1, comprising at least one segment comprising a first nanocomposite material and at least one additional segment comprising a polymer which is not a nanocomposite material.

4. The multicomponent fiber of claim 3, wherein said at least one additional segment comprises a polymer which is different from the polymer of the nanocomposite material.

5. The multicomponent fiber of claim 3, wherein said at least one additional segment comprises a polymer which is the same as the polymer of the nanocompsite material.

6. The multicomponent fiber of claim 5, wherein said multicomponent fiber comprises a nanoxomposite nylon core and an unfilled nylon sheath.

7. The multicomponent fiber of claim 2, wherein said platelet particles have an average diameter between about 10,000 Å and about 50 Å, and an aspect ratio lenght/thickness ranging from about 1000 to about 1.

8. The multicomponent fiber of claim 7, wherein said platelet particle have an average thickness of less than or about 20 Å.

9. The multicomponent fiber of claim 8, wherein said platelet particles have an average thickness of less than or about 10 Å.

10. The multicomponent fiber of claim 2, wherein said platelet particles comprise an exfoliated layered inorganic material.

11. The multicomponent fiber of claim 10, wherein said exfoliated layered inorganic material is a phyllosilicate clay.

12. The multicomponent fiber of claim 11, wherein said phyllosillicate is a smectic clay material.

13. The multicomponent fiber of claim 12, wherein said smectic clay material is selected from the group consisting of montmorillonite, montronite, beidellite, bentonite, volkonskite, laponite, hectorite, saponite, sauconite, magedlite, kenyaite, stevensite, and mixtures thereof.

14. The multicomponent fiber of claim 2, wherein the polymer of said nanocomposite material is a thermoplastic polymer.

15. The multicomponent fiber of claim 14 wherein said thermoplastic polymer is selected form the group consisting of polyolefins, polyesters, polyamide, and mixtures thereof.

16. The multicomponent fiber of claim 15, wherein said polymer is a polyamide.

17. The multicomponent fiber of claim 2 wherein said platelet particles are present in an amount ranging from about 0.01 to about 20 percent by weight, based on the total weight of nanocomposite material present in the fiber.

18. The multicomponent fiber of claim 17, wherein said platet particles are present in an amount ranging from about 0.1 to about 5 percent by weight.

19. The multicomponent fiber of claim 1, wherein said multicomponent fiber is selected from the group consisting of pie/wedge fibers, side-by-side fibers, segmented round fibers, segmented oval fibers, segmented rectangular fibers, segmented multilobal fibers, island in the sea fibers, and sheath/core fibers.

20. The multicomponent fiber of claim 1, wherein said multicomponent fiber is selected from the group consisting of continuous filaments, staple fibers, and meltblown fibers.

* * * * *

UNITED STATES PATENT AND TRADEMARK OFFICE
CERTIFICATE OF CORRECTION

PATENT NO. : 6,726,989 B2
DATED : April 27, 2004
INVENTOR(S) : Dugan

It is certified that error appears in the above-identified patent and that said Letters Patent is hereby corrected as shown below:

Column 6,
Line 34, "inon ganic" should read -- inorganic --;
Line 47, "nanoxomposite" should read -- nanocomposite --;
Line 51, "lenght" should read -- length --;
Line 54, "particle" should read -- particles --;
Line 65, "phyllosillicate" should read -- phyllosilicate --.

Column 7,
Line 1, "montronite" should read -- nontronite --;
Line 2, "vokonskite" should read -- volonskoite --;
Line 3, "magedlite" should read -- magadite --;
Line 8, "form" should read -- from --;
Line 9, "polyamide" should red -- polyamides --.

Column 8,
Line 2, "platet" should read -- platelet --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,726,989 B2 | Page 1 of 1 |
| APPLICATION NO. | : 10/068749 | |
| DATED | : April 27, 2004 | |
| INVENTOR(S) | : Dugan | |

It is certified that error appears in the above-identified patent and that said Letters Patent is hereby corrected as shown below:

Please insert line 2 in claim 13, "volkonskite" should read volkonskoite.

Signed and Sealed this

Twenty-ninth Day of August, 2006

JON W. DUDAS
*Director of the United States Patent and Trademark Office*